Dec. 28, 1948.　　　D. H. MITCHELL ET AL　　　2,457,704
MATERIAL SUPPORTING AND COOLING
APPARATUS FOR WELDING MACHINES
Filed March 27, 1946　　　　　　　　　　3 Sheets-Sheet 1

INVENTORS
D.H. MITCHELL
E.C. MOSS
BY
W.C. Parnell
ATTORNEY

INVENTORS
D.H. MITCHELL
E.C. MOSS
BY
W.C. Parnell
ATTORNEY

Dec. 28, 1948. D. H. MITCHELL ET AL 2,457,704
MATERIAL SUPPORTING AND COOLING
APPARATUS FOR WELDING MACHINES
Filed March 27, 1946 3 Sheets-Sheet 3

INVENTORS
D.H. MITCHELL
E.C. MOSS
BY
W.C. Parnell
ATTORNEY

Patented Dec. 28, 1948

2,457,704

UNITED STATES PATENT OFFICE 2,457,704

MATERIAL SUPPORTING AND COOLING APPARATUS FOR WELDING MACHINES

Donald H. Mitchell, Cranford, and Earl C. Moss, Westfield, N. J., assignors to Western Electric Company, Incorporated, New York, N. Y., a corporation of New York Application March 27, 1946, Serial No. 657,560

2 Claims. (Cl. 113—59)

This invention relates to welding apparatus, and more particularly to an apparatus for welding additional components to metal structures having locked-in stresses due to previous welding operations.

In welding components to metal structures formed of relatively thin walls, bearing in mind the need of accurately maintaining the positions of previously welded parts, it is important in making subsequent welds to prevent heat, caused by the present weld, from spreading to the areas of the previous welds.

An object of the invention is to provide an apparatus for accurately and efficiently welding additional components to metal structures having locked-in stresses due to previous welding operations without disturbing the structures adjacent previous welds.

In accordance with the object of the invention, the apparatus includes a table for supporting the metal structure, through which a pipe line for a coolant extends so as to position an adjustable spray nozzle to direct the coolant over the inner surface of the metal structure, while a metallic element is being welded to the outer surface thereof. A supporting unit mounted on the table has an adjustable holding member for the metallic element to accurately position and hold the element relative to the metal structure during the welding operation.

Other objects and advantages will be apparent from the following detailed description when considered in conjunction with the accompanying drawings, wherein Fig. 1 is a front elevational view of the apparatus, portions thereof being shown in section;

Figure 1:
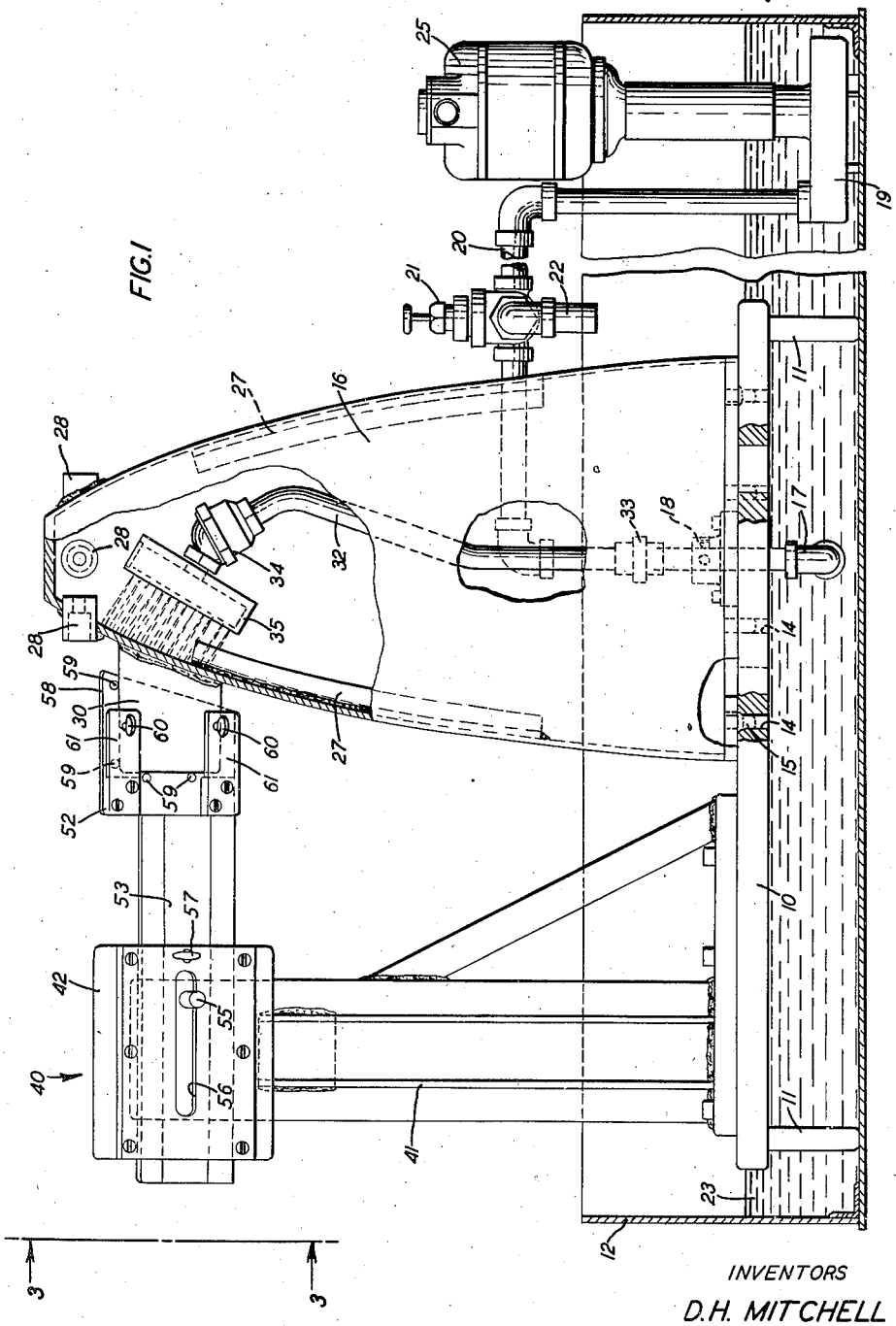
Figure 2:
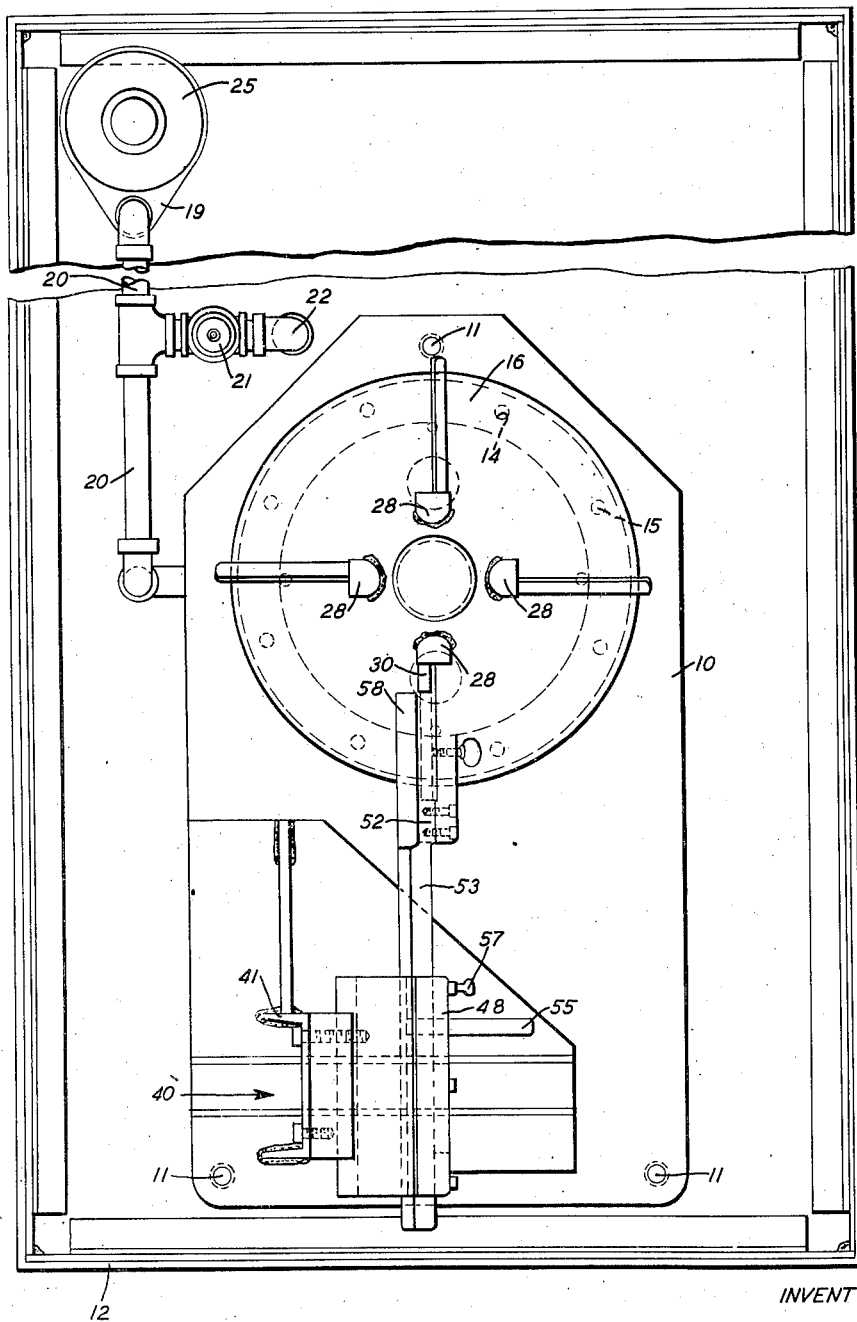
Fig. 2 is a top plan view of the apparatus.

Referring now to the drawings of the apparatus, a table 10 supported on legs 11 in a tank 12 has suitable apertures 14 therein to receive projections 15 of a flange of a metal structure 16 so as to accurately locate the structure on the table. A fluid line 17 extends through the table 10 and is held against displacement by a collar 18 mounted on the upper surface of the table and disposed concentric with the line 17. The fluid line 17 is connected to a pump 19 through a supply line 20, a valve 21 being disposed in the line 20. The purpose of the valve 21 is to provide a variable opening between the supply line 20 and an outlet or exhaust line 22 to vary the amount of coolant or water 23 pumped from the tank and forced through the lines 20 and 17. The outlet or exhaust 22 will allow the excess coolant to return to the tank. A motor 25 operatively connected to the pump 19 by conventional means (not shown) may be under the control of a conveniently positioned switch in a power circuit therefor.

Figure 4:
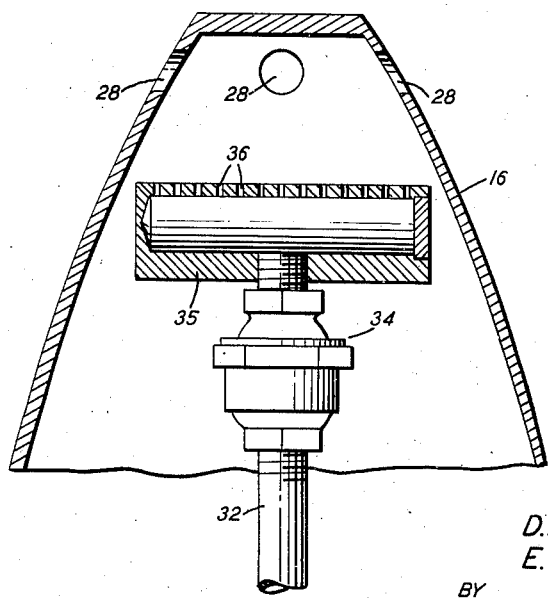
Fig. 4 is a fragmentary sectional view illustrating another position of the spraying head.

In the present illustration, the metal structure 16 is in the form of a shell with reenforcing ribs 27 and parts 28 secured in their respective positions by previous welding operations. In the present illustration, a metallic element 30 is to be welded to the outer surface of the structure 16 at an area adjacent one of the ribs 27 and also one of the parts 28. This area of the metal structure has locked-in stresses due to the previous welding of the adjacent reenforcing ribs 27 and parts 28. It is important that these components retain their present positions and that the operator avoid weakening or otherwise damaging the material of the metal structure in adding the metallic element 30 thereto. To accomplish this result, the fluid line 17 is provided with a section 32 of a suitable contour as illustrated in Fig. 1 connected to the line 17 by a couple 33 and having a universal connection 34 at the upper end thereof. The connection 34 supports, and is connected to, a spray nozzle 35 which may be of any suitable size or contour depending upon the area over which the coolant is to be sprayed. The head 35 is hollow and formed with a plurality of outlets 36 as illustrated in Fig. 4.

Figure 3:
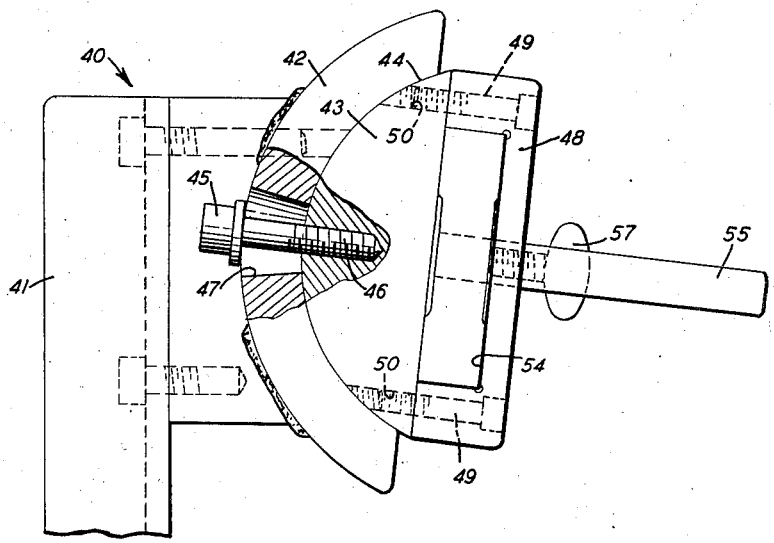
Fig. 3 is an enlarged fragmentary end elevational view taken along the line 3—3 of Fig. 1.

A supporting unit 40 includes a bracket 41 mounted upon the table 10 with an arcuate or concaved head portion 42 fixedly mounted upon the upper end thereof as shown in Fig. 3. A companion member 43 with a convexed surface 44 is disposed in the hollow of the head 42 and is secured in any desired adjusted position by the aid of screws 45 disposed in threaded apertures 46 of the companion member and extending through elongate apertures 47 of the head. A cover member 48, U-shaped in cross-section as shown in Fig. 3, is secured to the companion member 43 by screws 49 extending through apertures in the legs of the cover member and into threaded apertures 50 of the companion member. A carriage 52 has a portion 53 slidable in a guideway 54 formed by the U-shaped cover member 48 and the adjacent surface of the companion member 43. A pin or handle 55 extends through an elongate opening 56 in the cover member 48 for use in moving the carriage toward and away from the metal structure 16 so that the element 30 may be loaded therein and then positioned adjacent the metal structure. A locking screw 57 carried by the cover member 48 and positioned to engage the slide 53 functions to lock the carriage in position. The carriage includes a plate 58 with suitable pins 59 to be engaged by one side and the outer end of the element 30 for the location of the element in the carriage. Clamping screws 60 carried by the arms 61 of the carriage serve to lock the element in the carriage.

During the functioning of the apparatus, let it be assumed that the spray nozzle 35 is adjusted to the desired position for the next welding operation and that the metal structure 16 is lowered over the spray head and located on the table through the aid of the projections 15 entering the apertures 14. If desired, the operator may at this time cause operation of the pump through the energization of the motor 25 to circulate the coolant 23 through the supply lines and the nozzle to spray the coolant on the inner surface of the metal structure, on the outer surface of which the element 30 is to be secured. The element 30 may then be located in the carriage, which at this time is positioned away from the metal structure 16. After the element 30 is accurately located with respect to the pins 59 in the carriage and locked therein by the screws 60, the carriage with the element may be moved to the right until the leading surface of the element engages the metallic structure. At this time the operator determines whether or not the element is accurately located with respect to the metal structure. If adjustments are to be made, they can be brought about through the aid of the handle 55 by first loosening the screws 45 and then partially rotating the carriage in one direction or the other until the element is in the desired position relative to the metal structure. After this has been accomplished, the screws 45 may be driven until the companion member 43 is locked in the adjusted position in the head 42, after which the screw 57 may be tightened to lock the carriage in a position to hold the element 30 for welding.

The coolant having been and continuing to be applied to the opposing surface of the metal structure the heat created in the element and the adjacent surface of the metal structure will be prevented from spreading to the area including the rib 27 and the adjacent part 28, due to the continued application of the coolant. As previously described, the coolant may be varied by adjusting the valve 21 so as to cause either the complete capacity of the pump and fluid lines to be directed to the spray nozzle or any desired smaller quantities of the coolant.

Although specific improvements of the invention have been shown and described, it will be understood that they are but illustrative and that various modifications may be made therein without departing from the scope and spirit of this invention as defined by the appended claims.

What is claimed is:

1. A material supporting and cooling apparatus for welding machines comprising a table to support a metal structure having locked-in stresses due to previous welding of a part thereon, a carriage to support a metallic element, means to support the carriage for movement to position the element at selectively variable positions adjacent a surface of the metal structure whereby the element may be welded thereto, and means to direct a coolant to the opposing surface of the metal structure adjacent the metallic element to prevent spreading of heat, during welding of the element to the structure, to the area of the welded part.

2. A material supporting and cooling apparatus for welding machines comprising a table to support a metal structure having locked-in stresses due to previous welding of a part thereon, a carriage to support a metallic element, variable means to support the carriage in selected variable positions relative to the metal element for movement to position the element adjacent a given surface of the metal structure whereby the element may be welded thereto, a spray nozzle positioned to direct a coolant to the opposing surface of the metal member adjacent the element, a supply line for directing the coolant to the nozzle, means to force a constant quantity of the coolant into the supply line, and means in the supply line for exhausting varied quantities of the coolant to vary the resultant quantity of coolant directed to the nozzle.

DONALD H. MITCHELL.
EARL C. MOSS.

REFERENCES CITED

The following references are of record in the file of this patent:

UNITED STATES PATENTS

| Number | Name | Date |
| --- | --- | --- |
| 2,107,435 | Birmingham | Feb. 8, 1938 |
| 2,328,694 | Townsley | Sept. 7, 1943 |
| 2,389,560 | Steffens | Nov. 20, 1945 |